United States Patent [19]
Pettit

[11] Patent Number: 5,360,962
[45] Date of Patent: Nov. 1, 1994

[54] HEATING APPLIANCE WITH TRANSFORMERLESS POWER SUPPLY USING LOW-LOSS PASSIVE DIVIDER TO REDUCE AC LINE VOLTAGES

[76] Inventor: Frederick B. Pettit, 1514 House Road, Ridgeway, Ontario, Canada, L0S 1N0

[21] Appl. No.: 60,068

[22] Filed: May 13, 1993

[51] Int. Cl.$^5$ .............................................. H05B 1/02
[52] U.S. Cl. .................................. 219/497; 219/499; 219/501; 219/505; 307/117
[58] Field of Search ............... 219/494, 491, 497, 501, 219/499, 506, 505; 307/117; 323/235, 236

[56] References Cited
U.S. PATENT DOCUMENTS

| | | | |
|---|---|---|---|
| 3,943,331 | 3/1976 | Meijer | 323/22 |
| 3,982,098 | 9/1976 | Trostler | 219/501 |
| 3,988,682 | 10/1976 | Mikonis | 219/497 |
| 4,039,928 | 8/1977 | Noftsker et al. | 219/497 |

*Primary Examiner*—Mark H. Paschall
*Attorney, Agent, or Firm*—Mirek A. Waraksa

[57] ABSTRACT

A transformerless electrical appliance with an AC heating element uses a triac in series with the heating element and a control circuit responsive to a thermistor to regulate flow of heating current. A power supply is formed by a resistive divider that steps down the AC line voltage and a fullwave diode bridge that rectifies the stepped-down voltage. The resistance of the divider is comparatively high, limiting power dissipation in the divider, but incidentally producing significant variations in the power supply voltage (roughly 100% from minimum to maximum levels). The impedance of the divider element which conducts the operating current of the control circuit is selected to ensure that the average minimum power supply voltage is above the minimum operating voltage required by the control circuit. Resistive dividers are used to produce temperature and reference signals from the power supply voltage, making switching of the triac relatively immune to the significant variations in the supply voltage.

3 Claims, 2 Drawing Sheets

HEATING APPLIANCE WITH TRANSFORMERLESS POWER SUPPLY USING LOW-LOSS PASSIVE DIVIDER TO REDUCE AC LINE VOLTAGES

FIELD OF THE INVENTION

The invention relates generally to electrical appliances, such as friers or ovens, which have resistive heating elements, and more specifically, to regulating the flow of heating current in such appliances in response to temperature.

BACKGROUND OF THE INVENTION

A conventional electrical appliance such as an oven is normally connected with a power cord to an AC electrical main to conduct current through a resistive heating element. A bimetallic control is commonly used to control the current flow in response to temperature. The bimetallic control is located near the heating element, or in some part of the appliance housing where it can respond to excessive temperature, to assume an open, non-conductive state.

Various semiconductor switches capable of conducting large currents are known. However, bimetallic devices have remained the control of choice for AC-operated electrical appliances despite limited accuracy and limited functionality. Use of a semiconductor switch would require a temperature sensor and a control circuit responsive to operation of the sensor. These are normally operated with DC voltages, and, in any event, not at voltage levels associated with electrical mains. Transformers and regulated voltage supplies would normally be used to reduce voltage levels and provide DC operating voltages. Although very sophisticated solid-state control can then be implemented, the cost would far exceed that of using a simple bimetallic strip.

The present specification addresses such problems and provides inter alia an electrical heating appliance which incorporates a relatively low-cost current control circuit based on a semiconductor switching element.

SUMMARY THE INVENTION

In one aspect, in an appliance comprising an electrical heating element and a power line adapted to conduct a heating current to the heating element from an AC electrical main operating at a predetermined AC line voltage, the invention provides the improvement in which current flow through the heating element is controlled with a semiconductor switch, preferably a triac. The semiconductor switch is series connected with the heating element in circuit the power cord, and has a control terminal which responds to signals to set the conductive state of the switch. The conductive state of the switch is controlled by circuitry which includes a sensor positioned to sense temperature within the appliance, means responsive to the sensor that produce a temperature signal, adjustable reference means that produce a temperature threshold signal, and comparator means that compare the temperature and threshold signals and applying signals (optionally through an opto-isolation circuit) to the control terminal of the semiconductor switch, which correspond to differences between the temperature and threshold signals. A transformerless power supply, comprising a rectifier and a passive voltage-reducing circuit, rectifies and reduces the AC line voltage to produce a power supply voltage acceptable to the control circuitry.

The term "passive voltage-reducing circuit" as used herein indicates a circuit in which passive components, such as resistors, produce voltage drops attendant to current conduction that reduce an applied voltage. In a simple form, the voltage-reducing circuit may be constituted by a resistor in series with the rectifier between power lines of the cord. The preferred form, however, is a conventional resistive voltage divider, which provides a more predictable reduction in the AC line voltage. In any event, the voltage-reducing circuit will typically comprises an element which conducts the operating current required by the control circuit and which introduces a voltage drop that effectively reduces the AC line voltage to a level within the operating range of the control circuitry. That element will be referred to herein as the "voltage-drop element."

Using a resistive divider driven with AC line voltages to supply operating currents to other devices is contrary to conventional practice. A resistive voltage divider is commonly used to scale a voltage signal or to generate a reference signal from a constant voltage source. A high-impedance follower is often used to avoid loading the divider and disturbing the divider voltage (the scaled or reference signal). The desired output is essentially a voltage signal, not an operating current. To maintain a reliable supply voltage, despite variations in an operating current drawn from the divider, the impedance of the divider would have to be relatively low. Since conventional AC line voltages are to be applied to the divider, comparatively high power dissipation would be expected. Although discussed with reference to resistive voltage dividers, it will be appreciated that the same basic problem arises regardless of the exact form of the passive voltage-reducing circuit.

The present invention addresses the problem of power dissipation in two alternative ways. In one approach, the voltage-drop element, which potentially dissipates significant quantities of heat while reducing the line voltage, is arranged to provide a useful heating function. It is physically mounting together with the heating element in a compartment that is otherwise heated by the appliance. The overall impedance of the voltage-reducing circuit can be made comparatively low and the supply voltage can be maintained relatively constant.

An alternative approach abandons attempts to maintain a relatively constant power supply voltage. The control circuitry will typically draw an operating current whose magnitude varies significantly with the conductive state of the semiconductor switch. The operating current will typically have a maximum average current value when the switch is conductive and a minimum average current value when the switch is non-conductive. Since the voltage-drop element conducts the operating current, the power supply voltage also varies with the conductive state of the switch. It has a maximum average voltage value when the switch is non-conductive and a minimum average voltage value when the switch is conductive. The impedance of the voltage-drop element is selected comparatively high to reduce power dissipation in the voltage-reducing circuit. This accentuates the variation between maximum and minimum average voltage levels of the supply voltage, the variation in effect being a measure of the reduction in power dissipation which results. More specifically, the impedance of the voltage-drop element is selected to ensure such that the maximum average voltage value of the power supply voltage is at least 25% greater than the minimum average voltage value, but the minimum average voltage value remains above the minimum operating voltage required by the control circuit means. The latter characteristic ensures that the control circuitry is operative during a significant part of each half-cycle of the line voltage and can trigger the semiconductor switch for conduction. Following this approach, divider power losses can be limited to as little as 2 watts in 1500-watt appliances.

It should be noted that "average" values of currents and voltages for purposes of this specification are simple time averages over multiple cycles of the AC line voltage. Transient effects, as at zero cross-overs of the AC line voltage, are not critical considerations. A small capacitor may be used with the power supply to ensure continuous operation at zero cross-overs. In smaller heating appliances, it may be desirable not to use any capacitor in the power supply. Such matters are discussed below with reference to preferred embodiments.

Steps may be taken to accommodate significant variations in the power supply voltage. The reference signal generating means may comprise an adjustable voltage divider which divides the power supply voltage according to a settable ratio to produce the threshold signal. The temperature sensor may be a device whose resistance varies with temperature, and the temperature indicating means may define a resistive voltage divider which includes the temperature sensor. Since ratios of the power supply voltage are effectively compared, significant variations in the power supply voltage do not affect the comparison function.

Other aspects of the invention will be apparent from a description below of preferred embodiments and will be more specifically defined in the appended claims.

DESCRIPTION OF THE DRAWINGS

The invention will be better understood with reference to drawings in which.

DESCRIPTION OF PREFERRED EMBODIMENT

Figure 1:
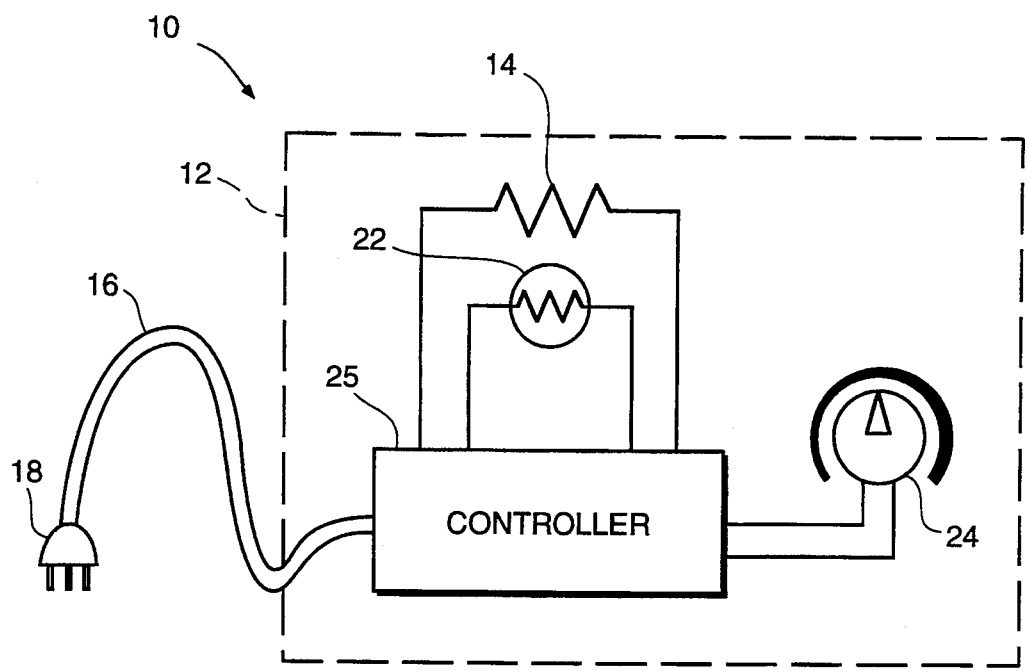
FIG. 1 is a diagrammatic representation of an electrical appliance which has a control circuit embodying the invention to regulate current flow through a resistive heating element.

Reference is made to FIG. 1 which diagrammatically illustrates a 1500-watt electrical appliance 10 with a housing 12 shown in phantom outline. The appliance 10 includes a conventional resistive heating element 14, which may have a resistance of 10 ohms. A conventional power cord 16, including a plug 18 with power terminals insertable into the receptacle of an electrical main 20 (indicated in FIG. 4), draws current from the main 20 to operate the heating element 14. The main 20 provides a line voltage of nominally 120 volts AC. A conventional thermistor 22 is mounted to the appliance 10 in proximity to the heating element 14 to sense and indicate temperature. The thermistor 22 has a resistance which varies inversely with temperature and has a nominal value of 10 kilohm at 25 degrees centigrade. A 50-kilohm potentiometer 24 with appropriate dial permits specification of a desired temperature, which is effectively expressed as a resistive divider ratio and then converted to a voltage signal, as discussed below. The flow of heating current through the heating element 14 is regulated by an on-off controller 25 which is responsive to the thermistor 22 and to the potentiometer 24.

Figure 4:
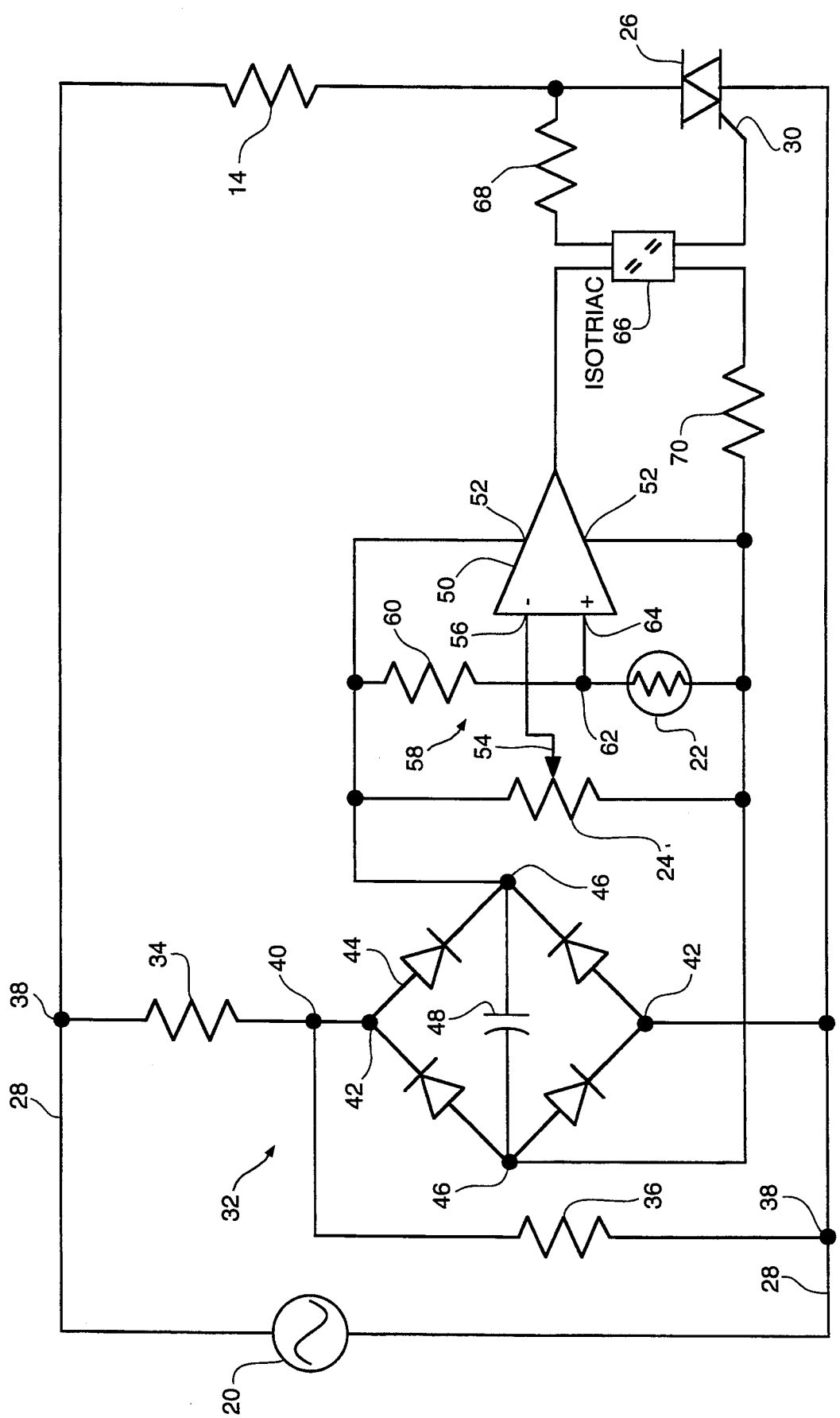

The circuitry associated with the appliance 10 is more apparent in FIG. 4. The heating element 14 is connected essentially in series with a triac 26 between lines 28 of the power cord 16. The triac 26 has a control terminal 30 which permits its conductive state, ON or OFF, to be set, thereby enabling or disabling the flow of current through the heating element 14.

The controller 25 includes a power supply that effectively reduces and rectifies the AC line voltage made available by the electrical main 20. The power supply includes a resistive voltage divider 32 comprising series-connected resistors 34, 36 that have nominal resistance values of 4.7 kilohms and 1 kilohm, respectively. The divider 32 has a pair of terminals 38 connected to the lines 28 of the power cord 16, and a node between the resistors 34, 36 which serves as an output terminal 40 at which the divider voltage appears. The divider 32 is loaded by other controller components and an exact division is not obtained. The divided AC line voltage is applied to the input terminals 42 of a conventional full-wave diode bridge 44. The bridge 44 produces a corresponding rectified voltage which is smoothed by a 10 microfarad electrolytic capacitor 48 and which is made available as the power supply voltage for the control circuitry at a pair of output terminals 46 associated with the bridge 44. Elimination of the capacitor 48 will be discussed below.

The controller 25 includes a control circuit which triggers the triac 26. The control circuit includes an operational amplifier 50 which functions as a comparator and which may be model no. MC1709CBI from Motorola Corporation. The power terminals 52 of the operational amplifier 50 are coupled to the output terminals 46 of the bridge 44 to receive the power supply voltage. The potentiometer 24 is also connected between the output terminals 46 of the bridge 44. Its wiper 54 produces a reference or threshold signal (a fraction of the power supply voltage as set by manually rotating the wiper 54 to vary the divider ratio of the potentiometer 24) that is coupled to the inverting input terminal 56 of the operational amplifier 50. Another resistive divider 58 is formed between the output terminals 46 of the bridge 44 by the thermistor 22 in series with a resistor 60. The node 62 between the thermistor 22 and the resistor 60 is connected to the non-inverting input terminal 64 of the operational amplifier 50. The output terminal 53 of the operational amplifier 50 is in turn coupled to the control terminal 30 of the triac 26 by a standard opto-isolation circuit which includes an isotriac 66 (which may be model MOC3022 from Motorola Corporation) and two resistors 68, 70 that limit current flow through the isotriac 66. When the temperature sensed by the thermistor 22 rises, the resistance of the thermistor 22 drops, until the divider voltage of the associated divider 58 drops below the threshold voltage. The operational amplifier 50 then produces nominally a zero output voltage which precludes conduction by the triac 26, which remains in its OFF state. When the sensed temperature drops, the resistance of the thermistor 22 rises, as does the divider voltage at the non-inverting terminal 64, and the operational amplifier 50 produces a positive voltage at its output terminal 53. The positive voltage is applied to the control terminal 30 of the triac 26, which assumes a ON state, conducting current through the heating element 14 in response to the AC line voltage.

Figure 2:
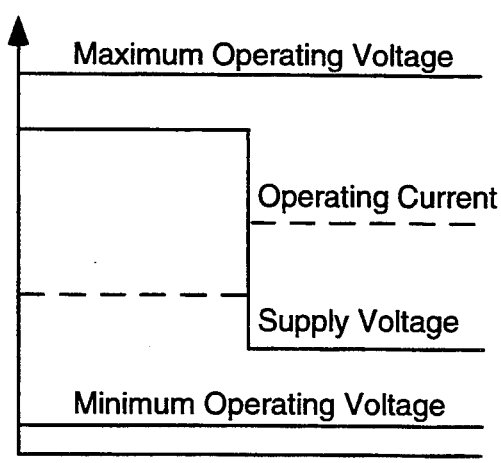
FIG. 2 diagrammatically illustrates current and voltage levels associated with the control circuit, which corresponds to the approach of allowing a power supply voltage to vary significantly.

Various average voltage and current levels associated with the circuitry are indicated in FIG. 2. The operational amplifier 50 determines what operating voltage may be applied to the control circuit. The amplifier 50 nominally requires a minimum operating voltage of 5 volts and a maximum operating voltage of 36 volts, well below the peak value of the AC line voltage. A power supply voltage less than the nominal maximum operating voltage is established by simply choose an appropriate divider ratio. The manufacturer's recommended maximum voltage may not be critical, as the power supply voltage achieves maximum values only when current requirements from the amplifier 50 are minimal.

The average value of the operating current required by the control circuit varies with the conductive state of the triac 26, and has been diagrammatically indicated with stippled lines in FIG. 2. Current demand increases dramatically when the triac 26 is triggered to its ON state, the operational amplifier 50 then being required to supply current to the isotriac 66. The control circuit might typically require a minimum average operating current of about 3 milliamperes (mA) when the triac 26 is non-conductive and a maximum average operating current of about 12 mA when the triac 26 is triggered. In the power supply, the resistor 34 of the divider 32 conducts the operating current required by the control circuit and serves as the voltage-drop element that reduces the AC line voltage to a level within the operating range acceptable to the control circuit. With a nominal value of 4.7 kilohms, the power supply voltage might vary from a minimum average value of about 8.5 volts to a maximum average value of about 16 volts. The maximum average power supply voltage is observed when the triac 26 is OFF and the operating current required by the control circuit is at its minimum average value. The minimum average power supply voltage is observed when the triac 26 is ON and the operating current required by the control circuit is at its maximum average value. There is a substantial swing in the power supply voltage, approaching 100% from minimum to maximum values, but it remains within the operating range acceptable to the amplifier 50. Although the high resistance of the resistor 34 results in what might be regarded as a wildly fluctuating supply voltage, the advantage obtained is that power consumption in the divider is limited to roughly 2 watts. It should be noted that numerical values of the operating currents and power supply voltages set forth above relate to a particular implementation of the circuit of FIG. 4 and were obtained by direct measurement. The values may vary significantly with components characteristics.

In general application of the invention, the minimum and maximum average operating currents of a desired control circuit should be determined and also its minimum and maximum operating voltages. The resistance of the divider element which conducts the operating current should be set as high as possible to reduce power dissipation in the divider, but should be limited to constrain the maximum power supply voltage to remain below the maximum operating voltage acceptable to the control circuit and the minimum average power supply voltage to remain above the minimum operating voltage acceptable to the control circuit.

Several aspects of the circuitry should be noted. The set point for shut-off is controlled by a resistive divider, the potentiometer 24. The temperature sensing circuit (thermistor 22 and resistor 60) is also a resistive divider (specifically divider 58). Both dividers are connected between the output terminals 46 of the rectifier bridge 44. Variations in the voltage applied to the passive divider 32, and tolerances in the impedance of the resistors 34, 36 constituting the divider 32 are consequently accommodated. Although the divider voltages may vary, they vary proportionately so that the reference shut-off point is still observed. This makes the circuitry relatively non-responsive to significant variations in the output voltage of the bridge circuit. In fact, the capacitor 48 has been eliminated entirely in prototype circuits and the comparator circuit has been operated exclusively from the unfiltered fullwave rectified voltage otherwise produced by the diode bridge 44, without impairment of the circuitry.

Elimination of the capacitor 48 is significant. Capacitors are relatively short-lived components. Eliminating the capacitor 48, reduces the likelihood of premature appliance failure. In appliances conducting large heating currents, it may be preferred to use the capacitor 48, despite such potential shortcomings. Without the capacitor 48, there may be delay in triggering of the triac 26 and premature shutting down of the triac 26, in each half-cycle of the line frequency. This will tend to occur during short instances at zero cross-overs of the line frequency, when the supply voltage may not be sufficient to allow the amplifier 50 to remain operative and consequently to trigger or maintain conduction by the triac 26. This may tend to heat the triac 50, creating a need for more expensive heating-sinking.

Figure 3:
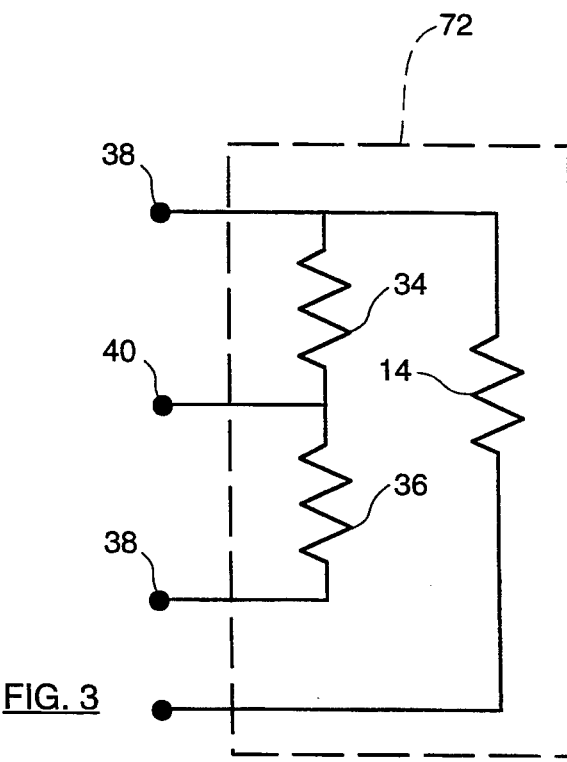
FIG. 3 is a diagrammatic representation of components of a resistive divider mounted in a common compartment with a heating element of the appliance; and, FIG. 4 is a schematic representation of the circuitry associated with the appliance.

FIG. 3 diagrammatically illustrates how the circuitry shown in FIG. 4 can be adapted to make power dissipation in the divider 32 less critical. As diagrammatically indicated in FIG. 3, both resistors 34, 36 of the divider 32 are mounted together with the resistive heating element 14 in a common compartment 72 of the appliance 10. The compartment 72 has only been indicated diagrammatically in phantom outline. In an oven, for example, that may be the compartment which is otherwise heated by the element 14. Each of the resistors 34, 36 may be formed of appropriate resistance wire selected to withstand elevated temperatures. The resistance of the elements 34, 36 may be selected sufficiently low that the operating current required by the control circuitry is insignificant compared to the current flow otherwise occurring in the divider 32 and the power supply voltage is comparatively stable. Assembly costs are expected to be significantly higher, but efficiency is enhanced.

It will be appreciated that particular embodiments of the invention have been described and that modifications may be made therein without departing from the spirit of the invention or necessarily departing from the scope of the appended claims. In particular, the order in which the AC line voltage is reduced and rectified is inconsequential. The bridge 44 might first rectify the AC line voltage, the rectified voltage might then be applied to the divider 32, and the supply voltage may be provided at the divider terminal 40. It should be noted that in either case the resistor 34 will conduct the operating current required by the control circuitry and will effectively reduce the magnitude of the line voltage.

I claim:

1. An appliance comprising an electrical heating element and a power cord adapted to conduct a heating current to the heating element from an AC electrical main operating at a predetermined AC line voltage, the appliance being adapted to control flow of the heating current in response to temperature and a settable temperature threshold, the appliance comprising:
   a semiconductor switch in series with the heating element, the semiconductor switch comprising a control terminal which controls the conductive state of the semiconductor switch in response to signals applied to the control terminal;
   control circuit means for controlling the conductive state of the semiconductor switch, the control circuit means comprising a sensor positioned to sense temperature within the appliance, means connected to the sensor for producing a temperature signal corresponding to the sensed temperature, adjustable reference means for producing a temperature threshold signal, and comparator means for comparing the temperature signal with the temperature threshold signal and applying signals to the control terminal of the semiconductor switch corresponding to differences between the temperature and threshold signals;
   transformerless power supply means for rectifying and reducing the AC line voltage to produce a power supply voltage acceptable to the circuit means, the power supply means being connected to the power cord to receive the AC line voltage and connected to the control circuit means to apply the power supply voltage to the control circuit means for operation thereof, the power supply means comprising a rectifier bridge and means defining a passive voltage-reducing circuit;
   the control circuit means requiring a predetermined minimum operating voltage and drawing an operating current from the power supply means which has a maximum average current value when the semiconductor switch is in a conductive state and a minimum average current value when the semiconductor switch is in a non-conductive state;
   the passive voltage-reducing circuit comprising a resistive element which produces a voltage drop that reduces the magnitude of the power supply voltage and which conducts the operating current of the control circuit means such that the power supply voltage has a maximum average voltage value when the semiconductor switch is in its non-conductive state and a minimum average voltage value when the semiconductor switch is in its conductive state, the resistance of the resistive element being selected such that the maximum average voltage value is at least 25% greater than the minimum average voltage value and such that the minimum average voltage value is above the predetermined minimum operating voltage required by the control circuit means.

2. The appliance of claim 1 in which the passive voltage-reducing circuit is a resistive voltage divider.

3. The appliance of claim 1 in which:
   the adjustable reference means comprise an adjustable voltage divider which divides the power supply voltage according to a settable ratio to produce the threshold signal;
   the temperature sensor is a device whose resistance varies with temperature; and,
   the means for producing the temperature signal define a resistive voltage divider which divides the power supply voltage to produce the temperature signal, the resistive divider comprising the temperature sensor.

* * * * *